United States Patent
Uegami

[19]

[11] Patent Number: 6,166,507
[45] Date of Patent: Dec. 26, 2000

[54] DISK DRIVE SYSTEM

[75] Inventor: Tomoaki Uegami, Kyoto, Japan

[73] Assignee: Rohm Co., Ltd., Kyoto, Japan

[21] Appl. No.: 09/293,914

[22] Filed: Apr. 19, 1999

[30] Foreign Application Priority Data

Apr. 21, 1998 [JP] Japan .................. H10-110826

[51] Int. Cl.$^7$ ............................................. H02P 5/17
[52] U.S. Cl. .................. 318/603; 318/560; 318/605; 318/608; 369/50; 369/59
[58] Field of Search ................. 318/560–696; 688/811, 813; 360/48–89; 369/50, 59, 124, 47, 48, 60, 44.34, 44, 35, 54, 225.3; 358/338

[56] References Cited

U.S. PATENT DOCUMENTS

| | | | |
|---|---|---|---|
| 4,959,733 | 9/1990 | Miura et al. | 358/338 |
| 5,193,146 | 3/1993 | Kohno | 388/811 |
| 5,856,962 | 1/1999 | Inagawa et al. | 369/50 |
| 5,856,963 | 1/1999 | Inagawa et al. | 369/50 |
| 5,878,007 | 3/1999 | Matsumoto et al. | 369/44.34 |

*Primary Examiner*—Paul Ip
*Attorney, Agent, or Firm*—Arent Fox Kintner Plotkin & Kahn PLLC

[57] ABSTRACT

In a disk drive system, whether the rotation rate of a motor provided to drive a disk is within a rated rotation rate range or not is checked every time the motor makes one complete turn. When the rotation rate of the motor is found to be within the rated range a predetermined number of times consecutively, a status signal, which is used to indicate that the rotation rate of the disk is within the rated range, is brought into a state for indicating that the rotation rate of the disk is within the rated range. This not only prevents the status signal from oscillating at a high frequency, but also allows the status signal to be brought into the state for indicating that the rotation rate of the disk is within the rated range only after the rotation rate of the motor has settled within the rated range. Thus, it is possible to eliminate the possibility of malfunctioning of a disk drive apparatus due to the status signal.

5 Claims, 7 Drawing Sheets

DISK DRIVE SYSTEM

BACKGROUND OF THE INVENTION

1. Field of the Invention

The present invention relates to a disk drive system for use, for example, in an FDD (floppy disk drive) apparatus.

2. Description of the Prior Art

Figure 4:
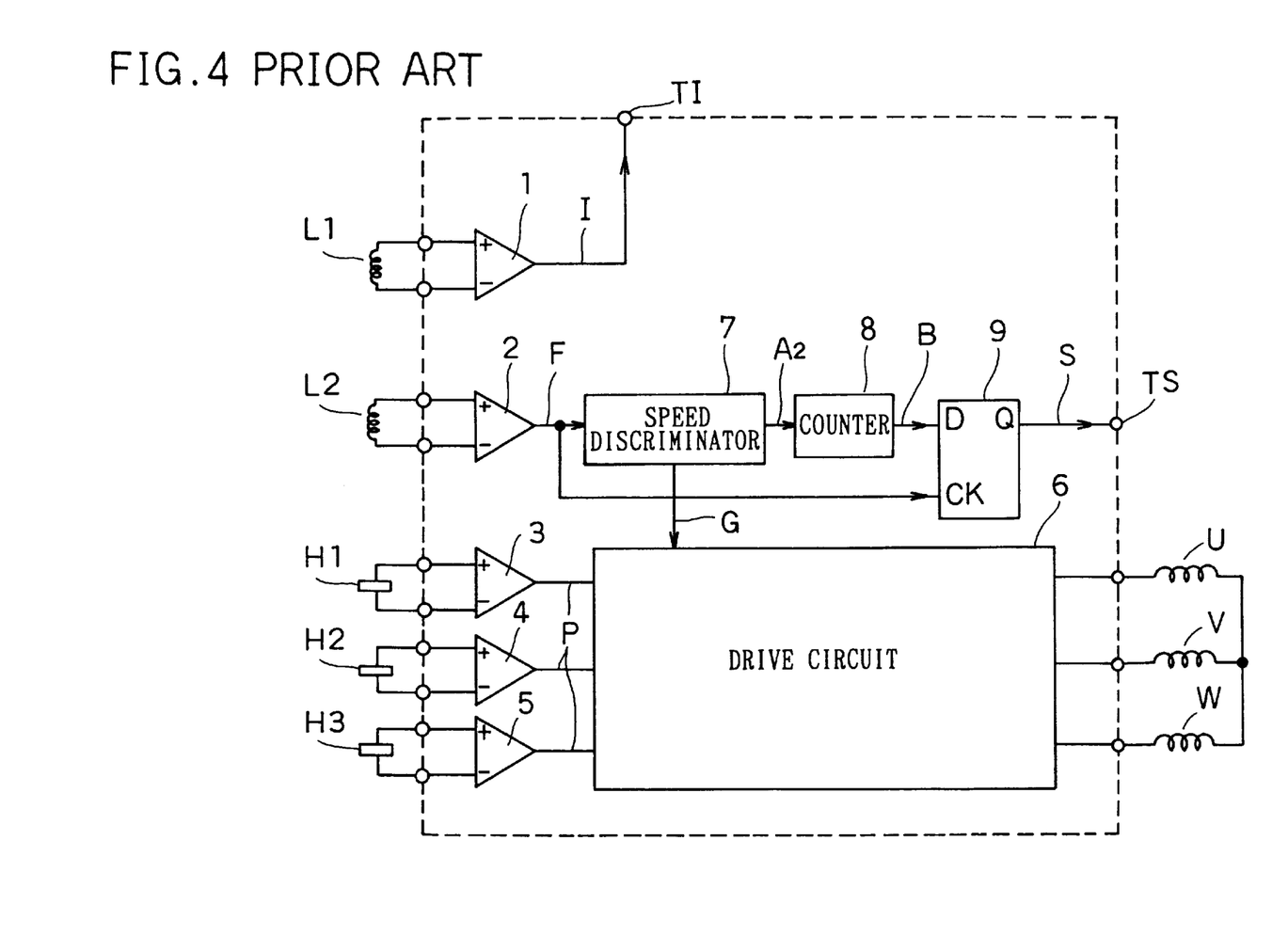
FIG. 4 is a block diagram of a conventional disk drive system.

FIG. 4 shows a block diagram of a conventional disk drive system designed for use in an FDD apparatus. In FIG. 4, near a spindle motor for rotating a disk, a coil L1 for reference position detection is arranged, of which both ends are connected to the input terminals of an index comparator 1. The index comparator 1 outputs a signal (hereafter referred to as the "index signal") I in which one pulse appears every time the spindle motor makes one complete turn.

This index signal I is fed out via a terminal TI, and is fed to a control circuit (not shown) that controls the operation of the various circuits constituting the FDD apparatus. Using the index signal I, the control circuit controls the timing with which data is written to and read from the disk.

Also arranged near the spindle motor is a coil L2 formed by a conducting pattern for rotation rate detection. This coil L2 generates a sine wave, which is converted by an FG comparator 2 into a square wave F (hereafter referred to as the "rotation rate detection signal") and then fed to the speed discriminator 7. In the rotation rate detection signal F, a plurality of pulses appear while the spindle motor makes one complete turn; the higher the rotation rate of the spindle motor, the shorter the period of the pulses, and the lower the rotation rate of the spindle motor, the longer the period of the pulses.

Around the rotor of the spindle motor are arranged Hall-effect devices H1, H2, and H3, which are connected to the input terminals of amplifiers 3, 4, and 5, respectively. The three output signals from these amplifiers 3, 4, and 5 are used as rotation position detection signals P that together indicate the rotational position of the spindle motor.

In accordance with the rotation position detection signal P, a drive circuit 6 switches with appropriate timing the current fed to the coils U, V, and W provided one for each of three phases in the spindle motor in such a way that the spindle motor rotates as efficiently as possible. Moreover, in accordance with the rotation rate error signal G described later that is fed from the speed discriminator 7, the drive circuit 6 determines the current fed to the coils of the spindle motor in such a way that the rotation rate of the spindle motor is kept at a predetermined rate.

Figure 5:
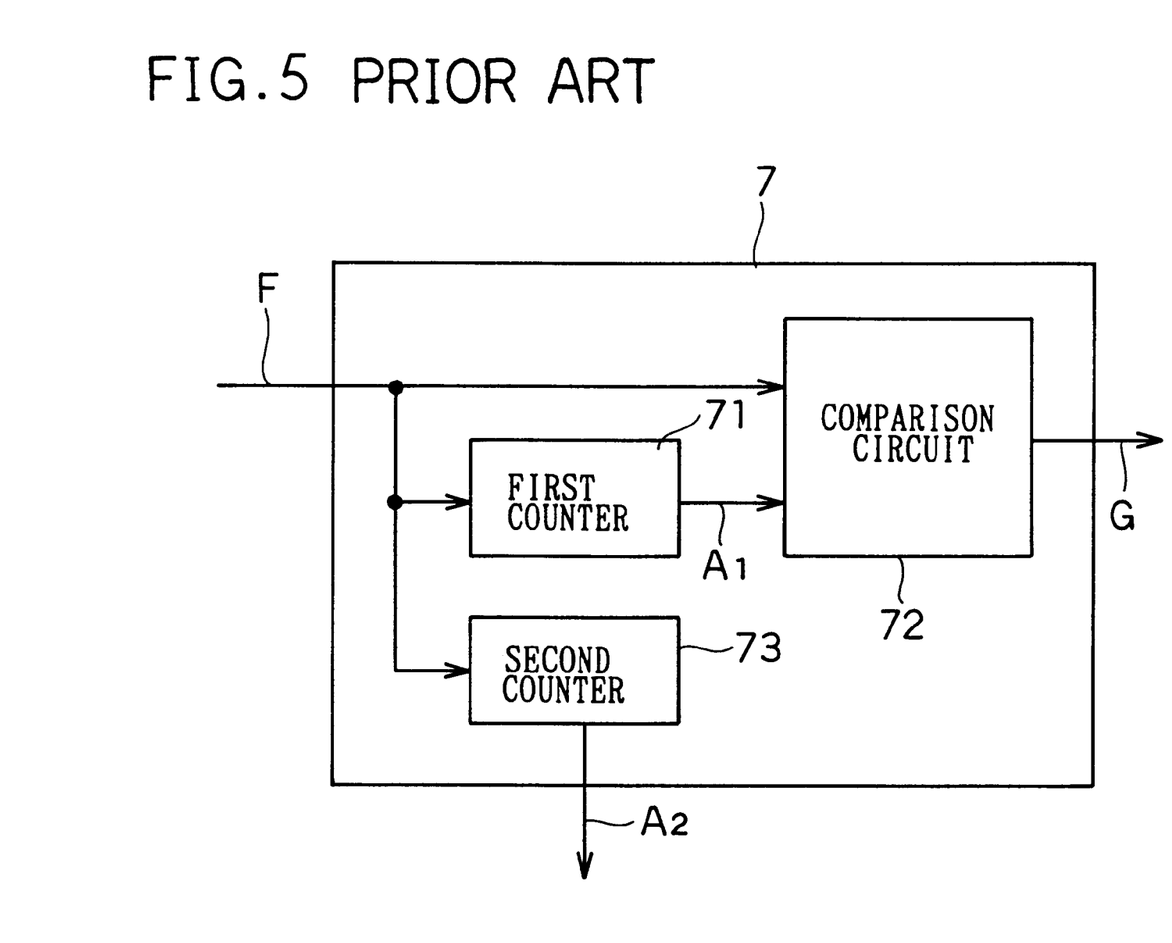
FIG. 5 is a diagram showing the configuration of the speed discriminator of the conventional disk drive system.

FIG. 5 shows the configuration of the speed discriminator 7. As shown in FIG. 5, the speed discriminator 7 has a counter 71 and a comparison circuit 72. The counter 71 counts a predetermined period; specifically, it counts the period of the rotation rate detection signal F as observed when the rotation rate of the spindle motor is equal to the central value of the rated rotation rate range. The comparison circuit 72 receives the signal $A_1$ output from the counter 71 and the rotation rate detection signal F, and compares the period of the rotation rate detection signal F with the period counted by the counter 71 so as to feed the drive circuit 6 with a rotation rate error signal G representing the difference between the periods of those two signals.

The speed discriminator 7 further has a counter 73 that counts a period shorter by t than the period counted by the counter 71. This counter 73, when triggered at a rising edge of the rotation rate detection signal F, turns its output to a low level and starts a counting operation, and, at the end of the counting operation, turns its output to a high level.

The signal A2 output from the counter 73 provided within the speed discriminator 7 is fed to a counter 8, which, when triggered at a rising edge of the signal A2, i.e. at the end of the counting operation of the counter 73, turns its output to a high level and starts its own counting operation, and, after counting a period of 2t, turns its output to a low level.

The signal B output from the counter 8 and the rotation rate detection signal F are fed to the data input terminal D and the clock input terminal CK, respectively, of a D flip-flop 9. The output terminal Q of this D flip-flop 9 is connected to a terminal TS. The signal output from the output terminal Q of the D flip-flop 9 is, as a status signal S, fed out of the disk drive system via the terminal TS.

Figure 6:
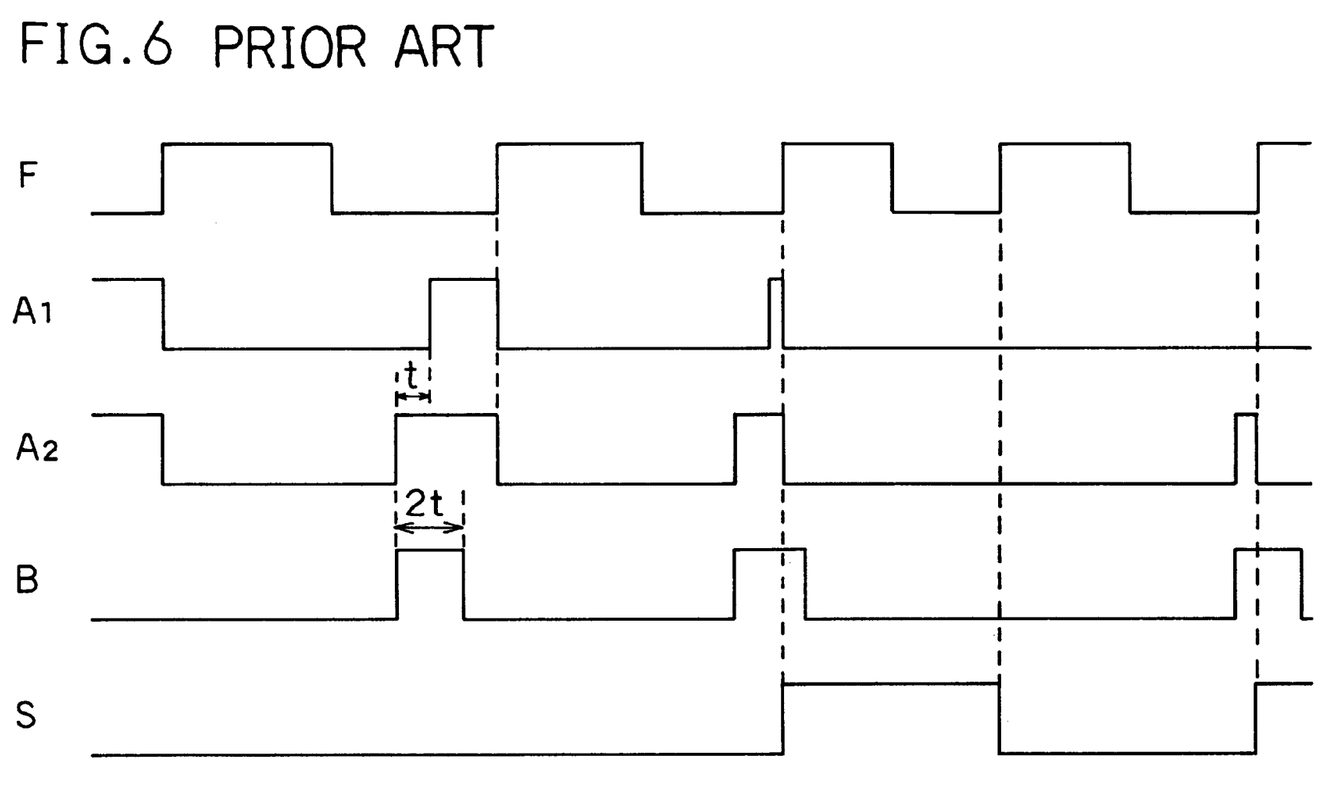
FIG. 6 is a timing chart of relevant signals in the conventional disk drive system.

FIG. 6 shows a timing chart of the relevant signals in this circuit configuration. Specifically, when the rotation rate of the motor is lower (or higher) than the rated rotation rate range, the rotation rate detection signal F turns from a low level to a high level after (or before) the signal B output from the counter 8 turns from a low level to a high level, and thus the status signal S is kept at a low level. By contrast, when the rotation rate of the motor is within the rated rotation rate range, the rotation rate detection signal F turns from a low level to a high level while the signal B output from the counter 8 is at a high level, and thus the status signal S is kept at a high level.

The status signal S is fed to the control circuit. When the status signal S turns to a high level, the control circuit recognizes that the current rotation rate of the disk is within the rated rotation rate range, and thus starts controlling data writing/reading operations against the disk.

Figure 7:
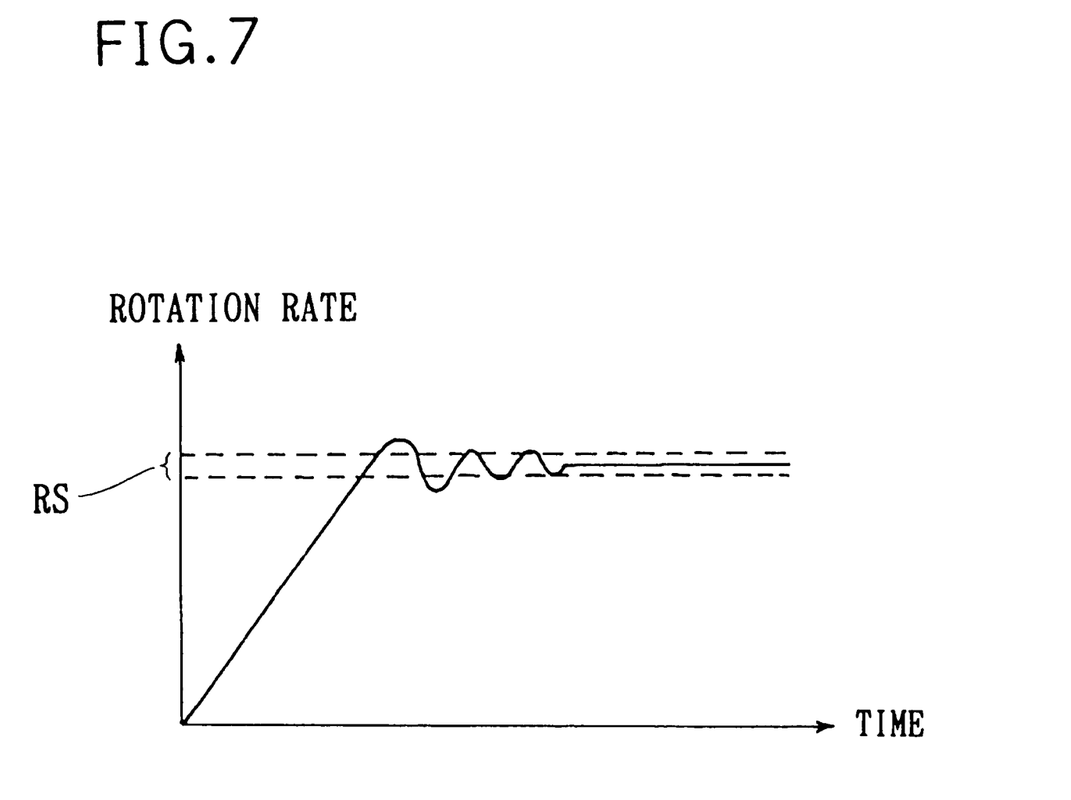
FIG. 7 is a diagram showing the fluctuation of the rotation rate observed when the spindle motor has just been started to rotate.

Here, it is to be noted that, as shown in FIG. 7, immediately after the spindle motor has been started to rotate, its rotation rate first varies unstably, becoming sometimes higher and other times lower than the rated rotation rate range RS, before settling within that range RS.

In the conventional disk drive system, whether the rotation rate is within the rated rotation rate range or not is checked at a rising edge of the rotation rate detection signal F. Since the rotation rate detection signal F is a high-frequency signal whose frequency varies according to the rotation rate of the spindle motor, when the rotation rate of the spindle motor is unstable as when the spindle motor has just been started to rotate, the status signal S is likely to oscillate between a high and a low level at a high frequency (see FIG. 6). This causes malfunctioning of the FDD apparatus.

Instead, when the rotation rate of the motor is unstable, the status signal S is as likely to be unnecessarily kept at a high level. This causes data writing/reading operations against the disk to be performed while the rotation rate of the motor is unstable, and thus causes malfunctioning of the FDD apparatus due to the status signal S.

To prevent such malfunctioning of the FDD apparatus, the side that receives the status signal S (i.e. the control circuit in the example described above) needs to be provided with a special means for that purpose.

SUMMARY OF THE INVENTION

An object of the present invention is to provide a disk drive system that does not cause malfunctioning of a disk drive apparatus due to the status signal that the disk drive system outputs to indicate whether the rotation rate of a motor is within the rated rotation rate range or not.

To achieve the above object, according to the present invention, in a disk drive system that is designed to output a status signal indicating whether the rotation rate of a disk is within a rated rotation rate range or not, whether the rotation rate of a motor that rotates the disk is within the rated rotation rate range or not is checked every predetermined period so that, when the rotation rate of the motor is found to be within the rated rotation rate range a predetermined number of times consecutively, the status signal is brought into a state for indicating that the rotation rate of the disk is within the rated rotation rate range.

In this disk drive system, by appropriately setting how many times consecutively the rotation rate of the motor should be found to be within the rated rotation rate range before bringing the status signal into the state for indicating that the rotation rate of the disk is within the rated rotation rate range, it is possible to prevent the status signal from oscillating at a high frequency, and it is also possible to allow the status signal to be brought into the state for indicating that the rotation rate of the disk is within the rated rotation rate range only after the rotation rate of the motor has settled within the rated rotation rate range.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
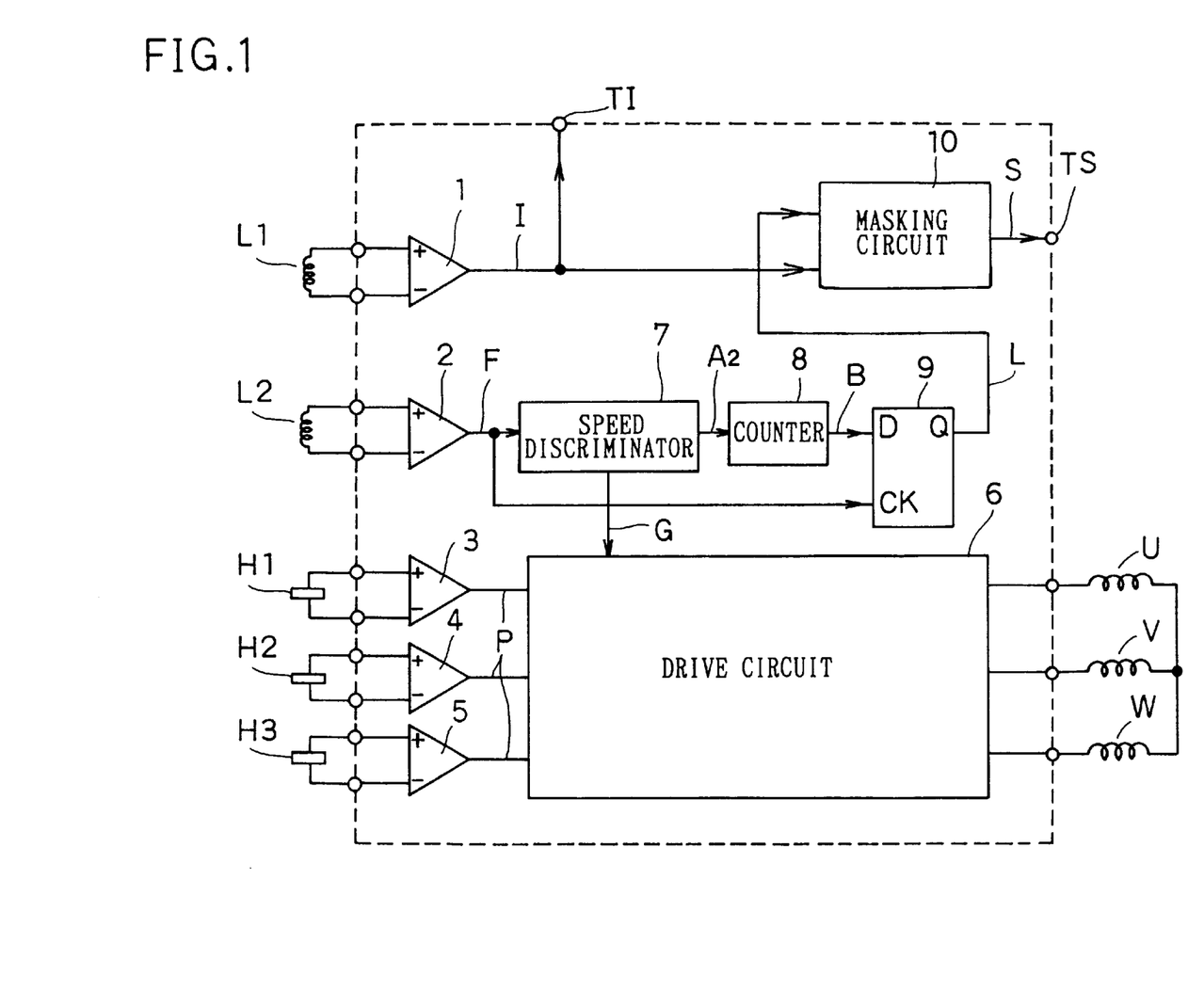
FIG. 1 is a block diagram of a disk drive system embodying the invention.

Hereinafter, an embodiment of the present invention will be described with reference to the accompanying drawings. FIG. 1 shows a block diagram of a disk drive system, designed for use in an FDD apparatus, embodying the invention. Note that, in the drawings and descriptions of the embodiment, such elements as are found also in the conventional disk drive system described earlier are identified with the same reference numerals and symbols, and overlapping descriptions will not be repeated.

In FIG. 1, the signal output from the output terminal Q of the D flip-flop 9 (this signal will hereafter be referred to as the "lock signal L") and the index signal I are fed to a masking circuit 10. The output of the masking circuit 10 is, as the status signal S, fed out via the terminal TS, and is then fed to the control circuit (not shown) provided to control the various circuits constituting the FDD apparatus.

Figure 2:
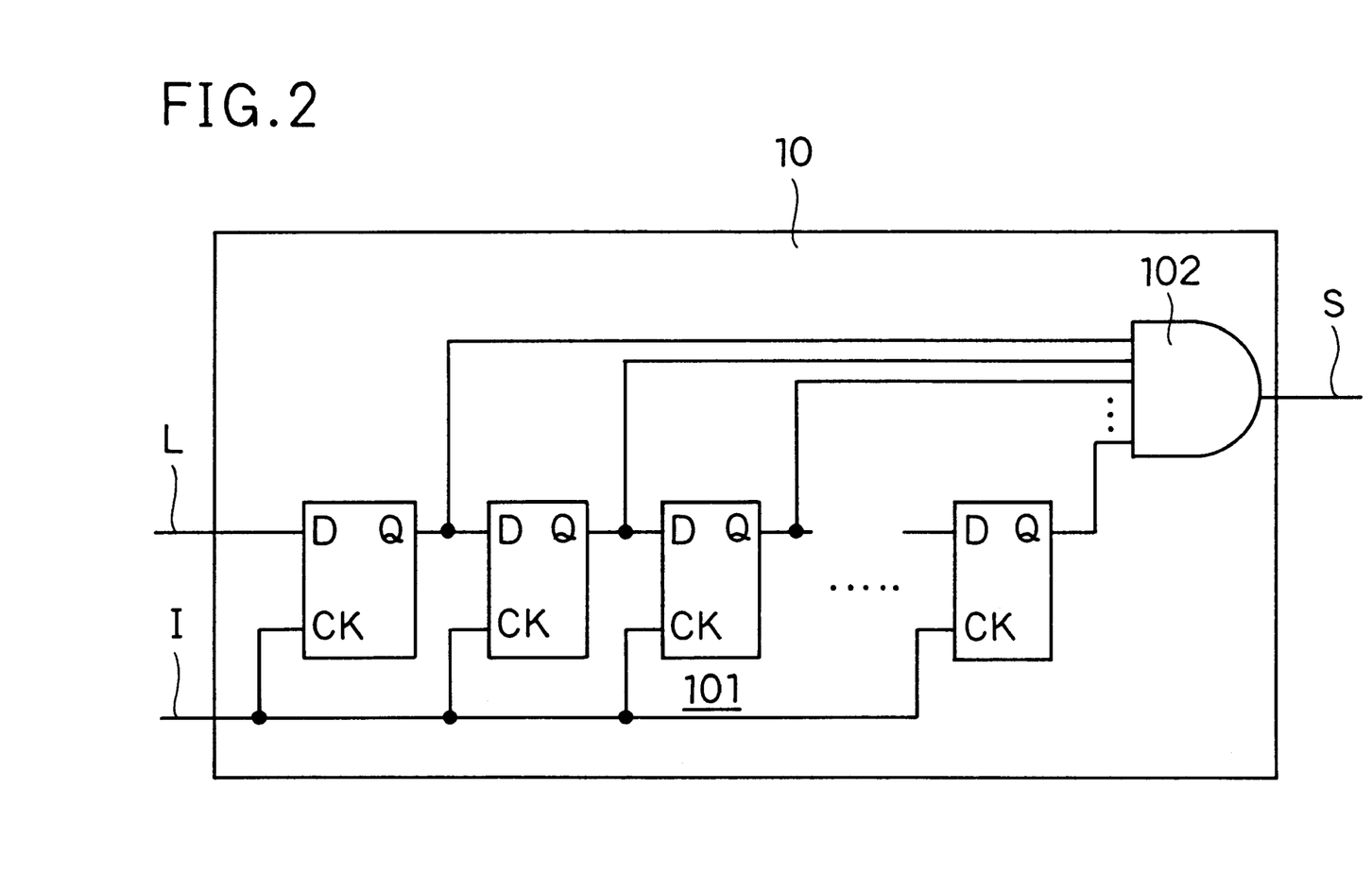
FIG. 2 is a diagram showing the configuration of the masking circuit of the disk drive system of the invention.

FIG. 2 shows the configuration of the masking circuit 10. As shown in FIG. 2, the masking circuit 10 is composed of a shift register 101, which consists of n stages of D flip-flops, and an AND circuit 102. The shift register 101 receives the lock signal L as data and the index signal I as a clock. The outputs of the individual stages of the shift register 101 are fed to the AND circuit 102, and the output of the AND circuit 102 is fed out of the masking circuit 10 as its output.

Figure 3:
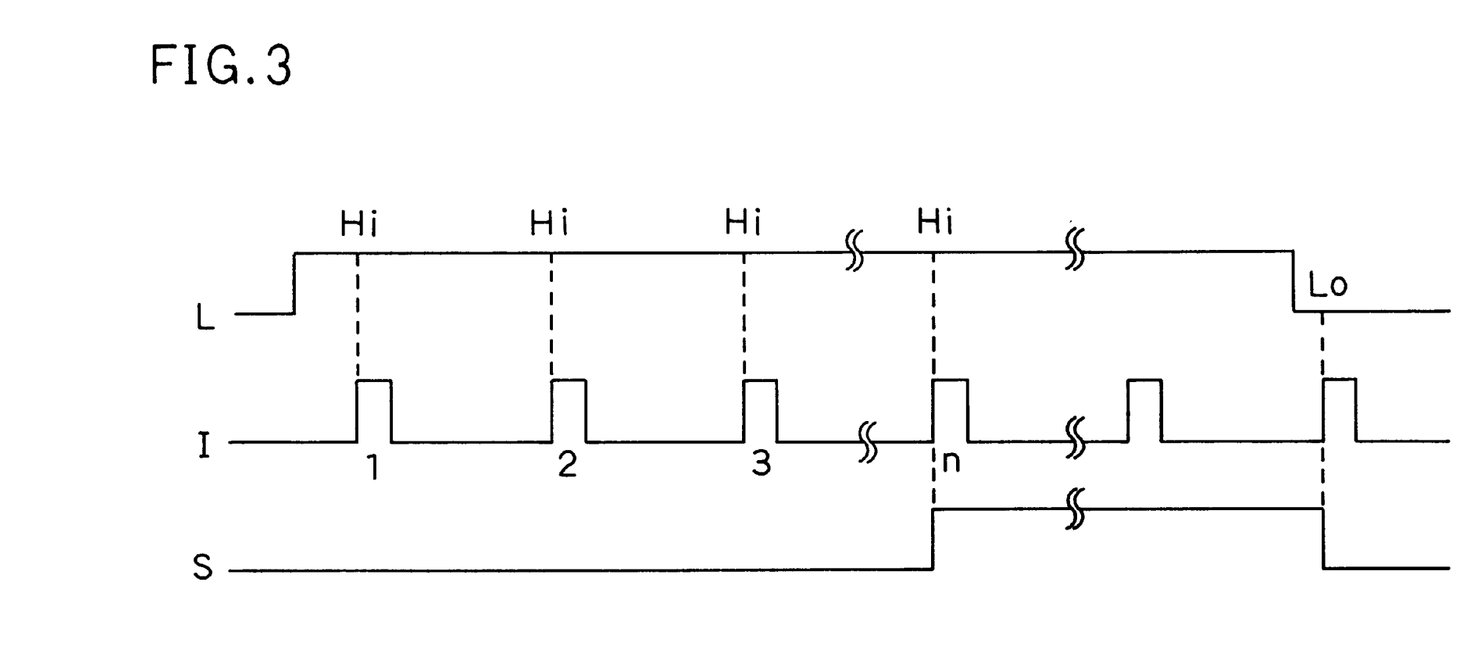
FIG. 3 is a timing chart of relevant signals in the disk drive system of the invention.

FIG. 3 shows a timing chart of relevant signals in the disk drive system of the embodiment. As shown in FIG. 3, if the lock signal L is at a high level, when the index signal I turns from a low level to a high level a number n of times consecutively, the status signal S turns from a low level to a high level. On the other hand, if the lock signal L is at a low level, when the index signal I turns to a high level, the status signal S turns from a high level to a low level.

Accordingly, the status signal S turns from a low level to a high level at the earliest when the index signal I turns to a high level for the nth time after the status signal S has turned from a high level to a low level. Moreover, the index signal I is a considerably slow clock whose frequency corresponds to the rotation rate (given in revolutions per minute) of the spindle motor. Thus, there is no possibility that the status signal S will oscillate at a high frequency.

On the other hand, when the rotation rate of the motor is so unstable as to become some times higher and other times lower than the rated rotation rate range as when the motor has just been started to rotate, the lock signal L fluctuates. As a result, the status signal S first remains at a low level, and, only after the rotation rate of the motor has settled within the rated rotation rate range, it turns to a high level.

Note that, even if the rotation rate has not yet settled within the rated rotation rate range and the lock signal L is fluctuating, there still remains a possibility that the status signal S will turn to a high level. However, by providing the shift register 101 with as great a number n of stages of D flip-flops as possible, it is possible to increase the probability that, while the lock signal L is fluctuating, the lock signal L happens to be at a low level at one of the n consecutive rising edges of the index signal L. This substantially eliminates the possibility that, while the lock signal L is fluctuating, the lock signal L is at a high level at all of the n consecutive rising edges of the index signal I.

Conventionally, even when the rotation rate of the motor is unstable, there is a possibility that the status signal S is kept at a high level. By contrast, in the embodiment under discussion, in such a case, the lock signal L is kept at a high level, and the status signal S turns to a high level only when the index signal I turns from a low level to a high level for the nth time after the lock signal L has turned to a high level. Accordingly, by appropriately setting the number n of D flip-flops provided in the shift register 101, it is possible to make the status signal S turn to a high level only after the rotation rate of the spindle motor has settled within the rated rotation rate range when the spindle motor has just been started to rotate.

Even when the lock signal L is kept at a high level while the rotation rate of the motor is unstable, it is possible to make the status signal S turn to a high level after the rotation rate of the motor has settled within the rated rotation rate range by setting the number of D flip-flops provided in the shift register 101 at about n=10, considering the rotation acceleration characteristics of the spindle motor. This or a similar setting also helps to substantially eliminate the possibility that, while the lock signal L is fluctuating, the lock signal L will be at a high level at all of the n consecutive rising edges of the index signal I, and thereby make the status signal S turn to a high level.

As described above, in this embodiment, there is no possibility that the status signal S will fluctuate at a high frequency. Moreover, since the status signal S turns to a high level only after the rotation rate of the motor has settled within the rated rotation rate range, there is no possibility of malfunctioning of the disk drive apparatus due to the status signal S. This makes it possible to prevent malfunctioning of the disk drive apparatus as experienced conventionally due to the status signal S on the part of the disk drive system, and thus eliminates the need to provide the side that receives the status signal S with a means for preventing such malfunctioning due to the status signal S.

To prevent the status signal S from fluctuating at a high frequency, and to permit the status signal S to turn to a high level only after the rotation rate of the motor has settled within the rated rotation rate range, it is necessary to feed the shift register 101 provided within the masking circuit 10 with a considerably slow clock. In this embodiment, the index signal I, which has conventionally been available, is used for that purpose. Accordingly, there is no need to design an additional counter and other components, and thus it is possible to minimize the increase in the circuit scale and complexity as well as in the costs of the disk drive system.

As described heretofore, in a disk drive system embodying the present invention, there is no possibility that the status signal, which indicates whether the rotation rate of the disk is within the rated rotation rate range or not, will fluctuate at a high frequency, and, since the status signal is brought into a state for indicating that the rotation rate of the disk is within the rated rotation rate range only after the rotation rate of the motor has settled within the rated rotation rate range, there is no possibility of malfunctioning of a disk drive apparatus due to the status signal. Moreover, since malfunctioning of the disk drive apparatus as conventionally experienced due to the status signal can be prevented in this way on the part of the disk drive system, there is no need to provide the side that receives the status signal with a means for preventing malfunctioning due to the status signal.

What is claimed is:

1. A disk drive system that is designed to output a status signal indicating whether a rotation rate of a disk is within a rated rotation rate range, comprising:

means for determining whether a rotation rate of a motor that rotates the disk is within the rated rotation rate range by checking every predetermined period so that, when the rotation rate of the motor is found to be within the rated rotation rate range a predetermined number of times consecutively, the status signal is brought into a state for indicating that the rotation rate of the disk is within the rate rotation rate range.

2. A disk drive system as claimed in claim 1, wherein whether the rotation rate of the motor is within the rated rotation rate range or not is checked in accordance with a rotation rate detection signal in which a pulse appears every predetermined period that corresponds to a period of rotation of the motor.

3. A disk drive system as claimed in claim 2, further comprising:

first counting means that starts counting at an edge of a pulse appearing in the rotation rate detection signal and that counts a period shorter by a predetermined length of time than a period of pulses appearing in the rotation rate detection signal when the rotation rate of the motor is equal to a predetermined rotation rate within the rated rotation rate range;

second counting means that starts counting when the first counting means finishes counting and that thereafter counts a period longer by a predetermined length of time than the period counted by the first counting means, the second counting means outputting a signal indicating whether it is in process of counting or not;

holding means that, in synchronism with the rotation rate detection signal, reads and holds a value represented by the signal output from the second counting means and that then outputs the value thus held;

delaying means that outputs a number n of signals obtained by delaying the signal output from the holding means by lengths of time that correspond to n cycles of a clock signal fed thereto; and logic means that calculates a logical product of the n signals output from the delaying means, wherein a signal output from the logic means is used as the status signal.

4. A disk drive system as claimed in claim 3, wherein an index signal, which is a pulse signal having a same period as the period of one-turn rotation of the motor, is fed as the clock signal to the delaying means.

5. A disk drive system comprising:

means for outputting a status signal indicating whether a rotation rate of a disk is within a rated rotation rate range or not;

means for generating an index signal, which is a pulse signal having a same period as a period of rotation of a motor that rotates the disk;

means for generating a rotation rate detection signal, which is a pulse signal whose period varies according to the period of rotation of the motor;

means for generating a rotation rate error signal that represents a deviation of an actual rotation rate of the motor from an ideal rotation rate thereof within the rated rotation rate range in accordance with the rotation rate detection signal;

means for generating a rotation position detection signal indicating a rotation position of the motor;

means for driving the motor in accordance with the rotation rate error signal and the rotation position detection signal;

means for checking whether the rotation rate of the motor is within the rated rotation rate range or not every predetermined period in accordance with the rotation rate detection signal; and means for bringing the status signal into a state for indicating that the rotation rate of the disk is within the rated rotation rate range when the rotation rate of the motor is found to be within the rated rotation rate range a predetermined number of times consecutively.

* * * * *